Dec. 14, 1926. 1,611,132

C. M. MANLY

CUSHION TIRE AND METHOD OF APPLYING SAME

Filed Dec. 26, 1922   2 Sheets-Sheet 1

Inventor
Charles M. Manly
By his Attorney
E. W. Scherr Jr.

Dec. 14, 1926. 1,611,132
C. M. MANLY
CUSHION TIRE AND METHOD OF APPLYING SAME
Filed Dec. 26, 1922 2 Sheets-Sheet 2
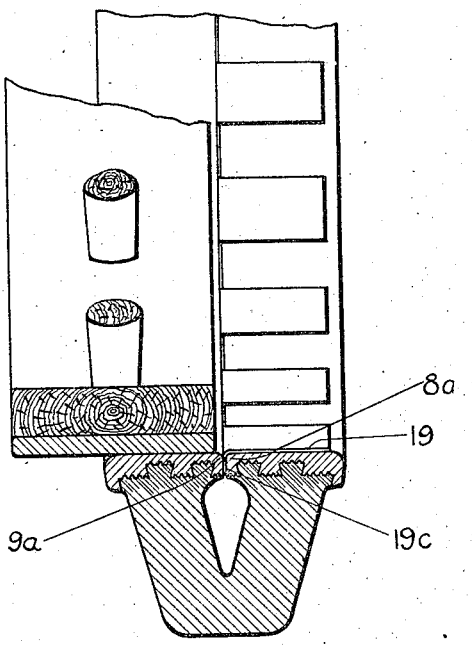
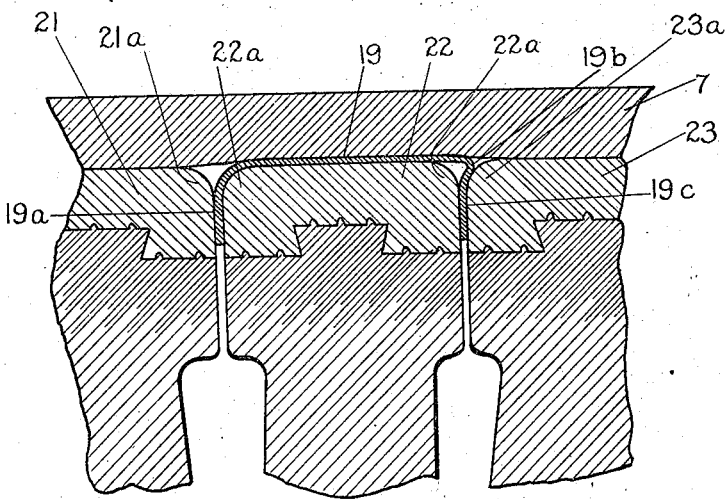

Patented Dec. 14, 1926.

1,611,132

UNITED STATES PATENT OFFICE.

CHARLES M. MANLY, OF KEW GARDENS, NEW YORK, ASSIGNOR TO O. & W. COMPANY, A CORPORATION OF NEW YORK.

CUSHION TIRE AND METHOD OF APPLYING SAME.

Application filed December 26, 1922. Serial No. 609,151.

My present invention relates to improvements in cushion tires and method of applying same, having a rubber cushion body containing an internal circumferentially extending cavity and vulcanized onto a plurality of parallel metal rings which form the tire base which is adapted to be secured to the rim or felloe of a vehicle wheel by being forcibly pressed thereon with its internal periphery tightly squeezing the outer periphery of the wheel rim or felloe.

My principal object is to so construct and arrange the parallel metal rings forming the tire base, that they will be adapted to retain during the pressing on operation, pieces of shimming material placed on the inner periphery of one or more of the rings to enable such rings to squeeze a portion of the wheel rim that is of smaller diameter as tightly as one or more of the other rings squeeze another portion of the wheel rim of larger diameter.

Figure 1:
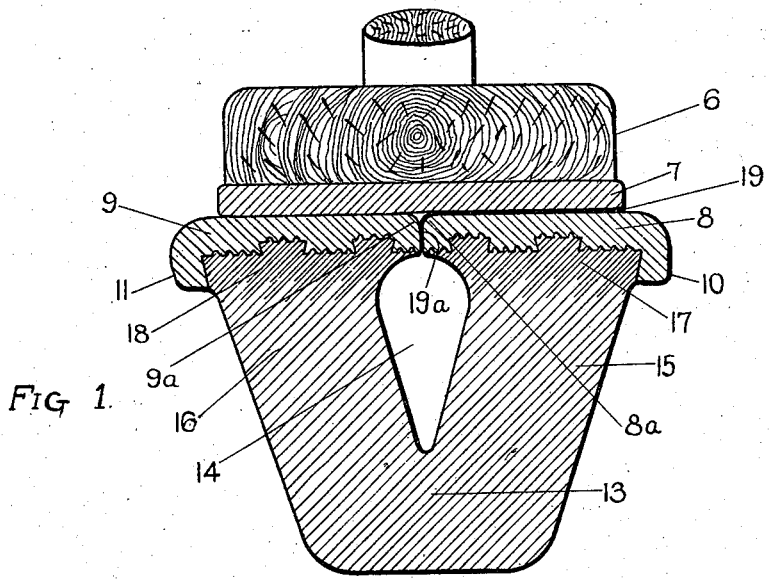
Figure 2:
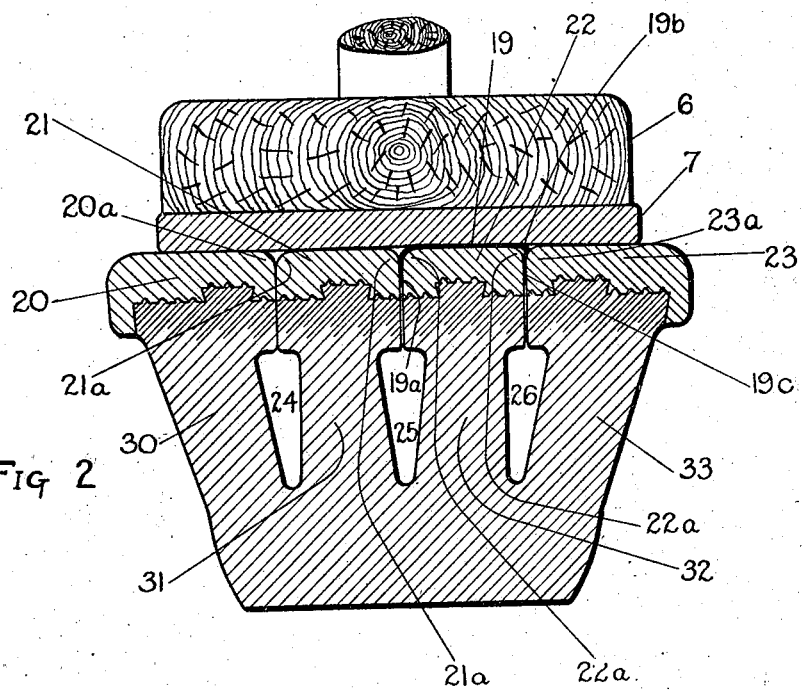

In the accompanying drawings, Fig. 1 is a cross sectional view of a tire embodying my invention, shown mounted on a portion of a vehicle wheel; Fig. 2 is a cross-section through a different form of tire, but also embodying my invention, and also shown mounted on a portion of a wheel; Fig. 3 is a view partly in section and partly in elevation showing a fragment of a conventional form of vehicle wheel with a similar fragment of a tire embodying my invention placed in position with respect thereto preparatory to being mounted on and secured to it by being forcibly pressed into engagement with the circumferential surface of the rim or felloe of the said wheel; and Fig. 4 is an enlargement of a portion of Fig. 2.

Referring now to the drawings, in which similar reference characters refer to the same or corresponding parts in all of the views, and particularly to Fig. 1, 6 is the felloe of an ordinary spoked wheel having a metal felloe band or wheel rim 7 shrunk or otherwise secured thereon. 8 and 9 are parallel metal rings embodying flanges 10 and 11 respectively, said rings with their flanges together constituting a channelled rim similar in all respect to the usual solid tire rim of the type adapted to be secured to the wheel by being forcibly pressed over the felloe band, except for the fact that in the usual solid tire the tire rim is a single ring of metal with the two flanges formed integrally therewith, whereas in the present case the rim is shown as comprising two similar parallel rings each carrying a single outer flange.

Mounted in the channel space of this rim formed by the two rings 8 and 9 is a rubber tire-body 13 formed with a hollow or cavity 14 therein with the two walls 15 and 16, respectively, into which the tire body is divided by the said cavity, united with the rings 8 and 9 by means of the hard rubber sections 17 and 18 which are mechanically joined and vulcanized to the said rings as well as integrally united by vulcanization to the said legs 15 and 16. It will be noted that the cavity 14 in the tire body is located in line with the joint between the abutting faces of the rings 8 and 9, this being done to enable the core used in molding the said tire to be removed by laterally spreading the said rings 8 and 9 apart, in which position the core for forming the said cavity may be readily removed in sections by withdrawing it into the interior of the ring, the main object of forming the metal base of the tire of two rings instead of a single one being to enable them to be thus spread apart to remove the core used in forming the interior cavity.

The tire of Fig. 2 differs from that just described in having four metal base-rings 20, 21, 22 and 23, and in having three hollows or cavities 24, 25 and 26, and four walls 30, 31, 32 and 33, which latter are vulcanized respectively to the aforesaid base rings 20, 21, 22 and 23, with the divisions between said walls and rings located in line with the cavities 24, 25 and 26 for the removal of the cores used in molding same.

In the application to vehicle wheels of the well known solid rubber automobile tires of the pressed-on type, it is frequently found that the rims or felloes of wheels that have previously had such tires applied to and used on them are of smaller diameter toward one edge than they are toward the other edge, and that the diameter of this smaller portion is such that when the tire rim is pressed onto such a wheel rim or felloe it does not squeeze this smaller portion very tightly. This is not such a serious matter where the tire rim is a single wide ring, provide a sufficiently large portion of its inner periphery does tightly squeeze the wheel rim or felloe. However, where the tire rim comprises two or more parallel rings, it is important that each of these rings independently squeezes the wheel rim or felloe sufficiently tightly to ensure that it will remain firmly fixed thereto under the heavy pounding stresses to which it is subjected in ordinary road use on a vehicle. I have found it expensive and unsatisfactory to attempt to so connect the parallel rings that the rigid fixing of one or more thereof to a wheel felloe will ensure the desirable rigidity of fixing of one or more other and looser rings.

On the other hand it is extremely difficult to apply shimming material to one or more of the separate rings comprising the base of a unitary tire in pressing the same on such a worn or defective wheel rim or felloe, unless the ring or rings to be shimmed are the first of the set being pressed on, or unless the shimming material is applied across the inner periphery of all of the rings before the first ring to be pressed on of an integrally connected set forming the base of a unitary tire is started into engagement with the periphery of the wheel rim or felloe. It, however, frequently happens that it is not desirable to have such shimming material across all of the rings, due to the fact that the wheel rim at one side is the proper size for the proper fit for the rings that form that portion of the tire base to be in proper engagement therewith, but it is necessary or desirable to have the shimming material across one or more of the other rings in order to make up for the smaller diameter of the wheel rim or felloe at that portion with which such rings will be engaged.

I have now found, however, that with such a tire rim comprising multiple parallel rings that abut laterally when in position on the wheel rim, I can apply the shimming material to one or more of the said rings as desired, without applying it to others where it is not desired, by introducing one end of each of a set of strips of such shimming material between the adjacent faces of a ring to be shimmed and the one next in advance of it and pulling the other end of each strip across the inner periphery of such ring or rings as need to have such shimming material applied to it or them.

Where only one or more interior rings of a set require such shimming material, the strips may be made only long enough to extend across the inner periphery of such rings as require such shimming material, the other ends of the said strips being either left free or if long enough, they may be tucked in between the last ring to be shimmed and the ring next beyond it.

When this shimming material has been thus applied to one or more of the rings in the above described manner, the tire may be placed on the wheel rim with the lower edge of the lower ring ready to engage the upper edge of the wheel rim or felloe preparatory to being pressed thereon. As soon as the traveling head of the press is brought down into contact with the uppermost ring and presses down on it, all of the rings will be successively forced tightly against the next lower ring, thereby clamping the ends of the strips of shimming material tightly wherever it has been placed and holding it securely as the successive rings are pressed on down over the wheel felloe, and especially as such rings as have the shimming material applied to them are forced across the peripheral surface of the said rim or felloe to their final position.

I have found that in applying such shimming material in the manner above described, that if the edges of the inner periphery of such rings as have the shimming material applied to them are left angular or sharp, the shimming material is frequently broken or cut as such rings are pressed on down to their position, thus permitting the shimming material to become displaced with respect to the rings for which it was intended. However, I have finally discovered a way to prevent this by rounding or bevelling (as shown at $8^a$ or $9^a$ in Figs. 1 and 3 or at $20^a$ to $23^a$ inclusive in Fig. 2) the inner peripheral edges of such rings as have such shimming material applied to them. In this way I have been able to minimize said difficulty of the shimming material being cut or broken as the rings are pressed on to the wheel rim or felloe, thereby assuring that the said shimming material will remain in its proper position with respect to the ring for which it is intended as the same is forced down to its final position.

I have also found that where fibrous material such as burlap is used for the shimming material that it tends to stretch considerably under the squeezing and pressing action, and that therefore in some cases the stretched material is dragged in under a following ring where it is not desired if there be no other place for it to go. By bevelling or rounding the inner peripheral edges of each ring to a greater extent than is necessary to merely prevent the shimming material from being cut by the edge, a peripheral groove is provided for receiving such stretched material, thus preventing it from being dragged under a following ring for which it was not intended.

The above facts will be more readily appreciated by reference to the drawings in Fig. 1, wherein the shimming material 19 is shown tightly squeezed between the inner periphery of the ring 8 and the outer periphery of the right-hand half of the felloe band 7 which is illustrated as of smaller diameter than the left-hand half. The inner end 19ª of the shimming material is shown gripped between the adjoining faces of the rings 8 and 9, while the outer end of the shimming material 19 is cut off flush with the right hand face of the felloe band 7. It will be clearly seen that in pressing this tire on this rim it would be best to do so by starting the left hand edge of the ring 9 into engagement with the right hand edge of the felloe band 7 and forcing it on across the face of the felloe band 7 as shown in Fig. 3 to the position shown, in Fig. 1, and that with one end of the strips of shimming material 19 gripped between the adjoining faces of the rings 8 and 9, and with the edge 8ª of the ring 8 rounded off as shown, the said strips 19 will be drawn in between the felloe band 7 and the ring 8 without danger of being cut by the edge 8ª or displaced and crumpled up as the pressing on is continued until the ring is brought to its final position on the band 7 as shown in Fig. 1. Unless these strips 19 are first clamped between the adjoining faces of the rings 8 and 9, I find it is impractical to apply them to shim only the aforesaid ring 8 of a tire as in Figs. 1 and 3.

In Fig. 2, the shim material 19 is shown applied to the ring 22 of a four base-ring tire. Here too it may be assumed that the tire has been pressed on the felloe beginning with the left-hand side of the tire in Fig. 2. After the rings 20 and 21 have then been pressed on and before the ring 22 is reached, the advance ends 19ª of the strips of shimming material 19 are placed between the adjoining faces of the rings 21 and 22 and their rear ends 19ᶜ between the adjoining faces of the rings 22 and 23, whereupon the pressing on of the tire is continued.

As an alternative to the foregoing, the shimming material may be applied to the inner periphery of the ring to be shimmed before the pressing on operation is begun, thus obviating the necessity for interrupting the operation (involving the loosening up of the press) and thus expediting the application of the tire to the wheel.

The inevitable stretching of the shimming material during the pressing on operation gives an excess length thereto which accumulates at 19ᵇ and is received and taken care of in the groove formed by the bevelled corners between the rings 22 and 23 as best shown in Fig. 4, thereby preventing said excess material from interfering in any way with the proper pressing on of the succeeding ring or rings.

Since, in the marketing of such tires and the general application of them to wheel felloes, it is impossible to know in advance which portion or how much of the wheel felloe will be of such a diameter as requires the use of such shimming material, I have found it desirable to bevel or round off the inner peripheral edges of all of the rings of a set forming the base of a unitary tire, thereby ensuring that such bases will be in proper condition to receive the shimming material on any of the rings for which it may be required under the conditions of actual practice.

It will also be appreciated that the bevelling or rounding of the inner edges of the base rings not only secures the advantages defined in connection with the use of shimming material in applying the tire to the wheel, but also obviates the difficulty frequently experienced in pressing such multiple base rings on to a felloe band arising from the fact that the rings sometimes are slightly eccentric to each other and where the inner edges are square, the square corners catch on the felloe band during the pressing-on operation and are either abraded or the ring is cocked so that it tends to jam or start on out of parallel, whereas with these inner edges bevelled or rounded, any eccentricity of a following ring with respect to the one preceding it, is overcome by the bevelled corner ensuring a square engagement of the ring with the felloe.

What I claim is:

1. In combination, a tire of the pressed-on type having multiple metallic base-rings vulcanized to the unitary rubber body of the tire, said rings at their inner peripheries having at least one of their adjoining corners bevelled off; and a strip of shim material extending laterally across the inner periphery of a base-ring of the foregoing with its forward end gripped between the adjoining faces of said rings when pressing on the tire.

2. In combination, a tire of the pressed-on type having multiple metallic base-rings vulcanized to the unitary rubber body of the tire; and a strip of shim material extending laterally across the inner periphery of a base-ring of the foregoing with its forward end gripped between the adjoining faces of said rings when pressing on the tire.

3. In combination, a tire of the pressed-on type having multiple metallic base-rings vulcanized to the unitary rubber body of the tire; and a strip of shim material extending laterally across the inner periphery of a base-ring of the foregoing with its forward and rear ends both gripped between the adjoining faces of said rings when pressing on the tire.

In testimony whereof, I have signed my name to this specification this 22d day of December, 1922.

CHARLES M. MANLY.